United States Patent [19]

Heffernan

[11] 4,201,061
[45] May 6, 1980

[54] AUTOMATIC CHILLED WATER SETPOINT TEMPERATURE CONTROL

[75] Inventor: Edward J. Heffernan, Skaneateles, N.Y.

[73] Assignee: Carrier Corporation, Syracuse, N.Y.

[21] Appl. No.: 889,089

[22] Filed: Mar. 22, 1978

[51] Int. Cl.² .......................... F25D 17/00; F25B 1/00
[52] U.S. Cl. ............................................ 62/98; 62/180; 62/201; 62/228
[58] Field of Search ............... 62/201, 180, 98, 228 C, 62/175, 212, 158; 415/48

[56] References Cited

U.S. PATENT DOCUMENTS

| | | | |
|---|---|---|---|
| 3,250,084 | 5/1966 | Anderson | 62/212 |
| 4,060,997 | 12/1977 | Shultz et al. | 62/180 |
| 4,152,902 | 5/1979 | Lush | 62/157 |

Primary Examiner—Lloyd L. King
Assistant Examiner—Harry Tanner
Attorney, Agent, or Firm—J. Raymond Curtin; John S. Sensny

[57] ABSTRACT

An automatic chilled water setpoint temperature control for use with a mechanical refrigeration machine. The control includes means to sense the magnitude of a first electric control signal which is produced by the machine and which is a function of the amount of work done by the compressor of the machine. The control also includes means to change the magnitude of a second electric control signal, which is also produced by the machine and which represents a variable component of the setpoint temperature, in response to a change in the magnitude of the first electric control signal so that the variable component of the setpoint temperature changes in response to a change in the amount of work done by the compressor. The control further includes means to delay changing the magnitude of the second electric control signal so that the amount of work done by the compressor becomes stable before the variable component of the setpoint temperature changes.

11 Claims, 2 Drawing Figures

AUTOMATIC CHILLED WATER SETPOINT TEMPERATURE CONTROL

BACKGROUND OF THE INVENTION

This invention relates generally to mechanical refrigeration machines such as centrifugal refrigeration machines, and more particularly to an automatic control for such machines.

Mechanical refrigeration machines include, generally, an evaporator or cooler section, a compressor, and a condenser. Often, a refrigerant is circulated through the evaporator, a chilled water coil is positioned in the evaporator, and water is circulated through that coil so that heat is transferred from the water to the refrigerant in the evaporator. The chilled water can then be circulated to a remote location to satisfy a refrigeration load. The refrigerant evaporates as it absorbs heat from the water, and the compressor is arranged to extract refrigerant vapor from the evaporator, compress the refrigerant thereby increasing its temperature, and discharge the refrigerant into the condenser. The refrigerant is condensed and cooled in the condenser and then redelivered to the evaporator where the cycle begins again.

In order to minimize operational cost, it is generally desirable to match the amount of work done by the compressor to that which is needed to satisfy the refrigeration load placed on the refrigeration machine. Commonly, in centrifugal refrigeration machines, this is done by regulating the amount of refrigerant vapor flowing through the compressor by means of a plurality of guide vanes which are positioned between the compressor and the evaporator and which modulate between a fully open and a fully closed position in response to the temperature of the chilled water as it leaves the chilled water coil in the evaporator. When the temperature of this water falls, indicating a reduction in the refrigeration load on the machine, the guide vanes move toward the closed position, decreasing the amount of vapor flowing through the compressor. This decreases the amount of work that must be done by the compressor, thereby decreasing the amount of energy needed to operate the machine. At the same time, this has the effect of increasing the temperature of the chilled water leaving the evaporator. In contrast, when the temperature of the leaving chilled water rises, indicating an increase in the load on the machine, the guide vanes move toward the fully open position. This increases the amount of vapor flowing through the compressor. The compressor does more work, decreasing the temperature of the chilled water leaving the evaporator and allowing the refrigeration machine to respond to the increased refrigeration load.

As a general rule, the compressor operates to maintain the temperature of the chilled water leaving the evaporator at, or within a certain range of, a specific, or setpoint, temperature. This certain range is referred to as the throttling range of the system, and it lends stability to the control system of the machine. A detailed discussion of the throttling range is given in U.S. Pat. No. 3,250,084, granted to Carl M. Anderson on May 10, 1966, for "Control Systems."

It is known that when the compressor and, hence, the refrigeration machine are operating at less than maximum capacity, that is, at partial load conditions, significant energy savings can be achieved without affecting the ability of the machine to satisfy the refrigeration load placed thereon by raising the setpoint temperature. The energy savings are due to the fact that raising the setpoint temperature reduces the amount of work which must be done by the compressor to maintain the chilled water at, or within the throttling range of, the setpoint temperature. The refrigeration load can be satisfied because, provided that the setpoint temperature is not raised too high, the chilled water is still sufficiently cool to absorb enough heat from the refrigeration load to produce the desired effect.

In the past, typically, automatic control of the chilled water setpoint temperature has been accomplished by regulating the setpoint temperature in response to any one or more of several ambient factors. This has often required a complex and costly pneumatic or electronic control system.

SUMMARY OF THE INVENTION

In view of the above, an object of the present invention is to improve mechanical refrigeration machines.

Another object of this invention is to improve control systems for mechanical refrigeration machines.

A further object of the invention is to supply a mechanical refrigeration machine with an improved automatic control for varying the chilled water setpoint temperature in response to changes in the refrigeration load on the machine.

A further object of the present invention is to provide a control for automatically regulating the chilled water setpoint temperature of a mechanical refrigeration machine which is relatively simple, reliable and inexpensive, and which can easily be installed on many existing machines.

These and other objectives are attained with a novel automatic chilled water setpoint temperature control for use with a mechanical refrigeration machine. The control includes means to sense the magnitude of a first electric control signal, which is produced by the machine and which is a function of the amount of work done by the compressor of the machine; means to change the magnitude of a second electric control signal, which is produced by the machine and which represents a variable component of the setpoint temperature, in response to a change in the magnitude of the first electric control signal so that the variable component of the setpoint temperature changes in response to a change in the amount of work done by the compressor; and means to delay changing the magnitude of the second electric control signal so that the amount of work done by the compressor becomes stable before the variable component of the setpoint temperature changes.

Further benefits and advantages of the invention will become apparent from a consideration of the following description and drawings.

DETAILED DESCRIPTION OF THE PREFERRED EMBODIMENT

For the purpose of this specification, the present invention will be described in reference to a mechanical refrigeration machine employing a centrifugal compressor since such machines are, typically, well adapted to utilize the teachings disclosed herein. It should be clear, though, that the present invention has application generally to mechanical refrigeration machines and may, for example, be utilized with a refrigeration machine employing a reciprocating compressor.

Figure 1:
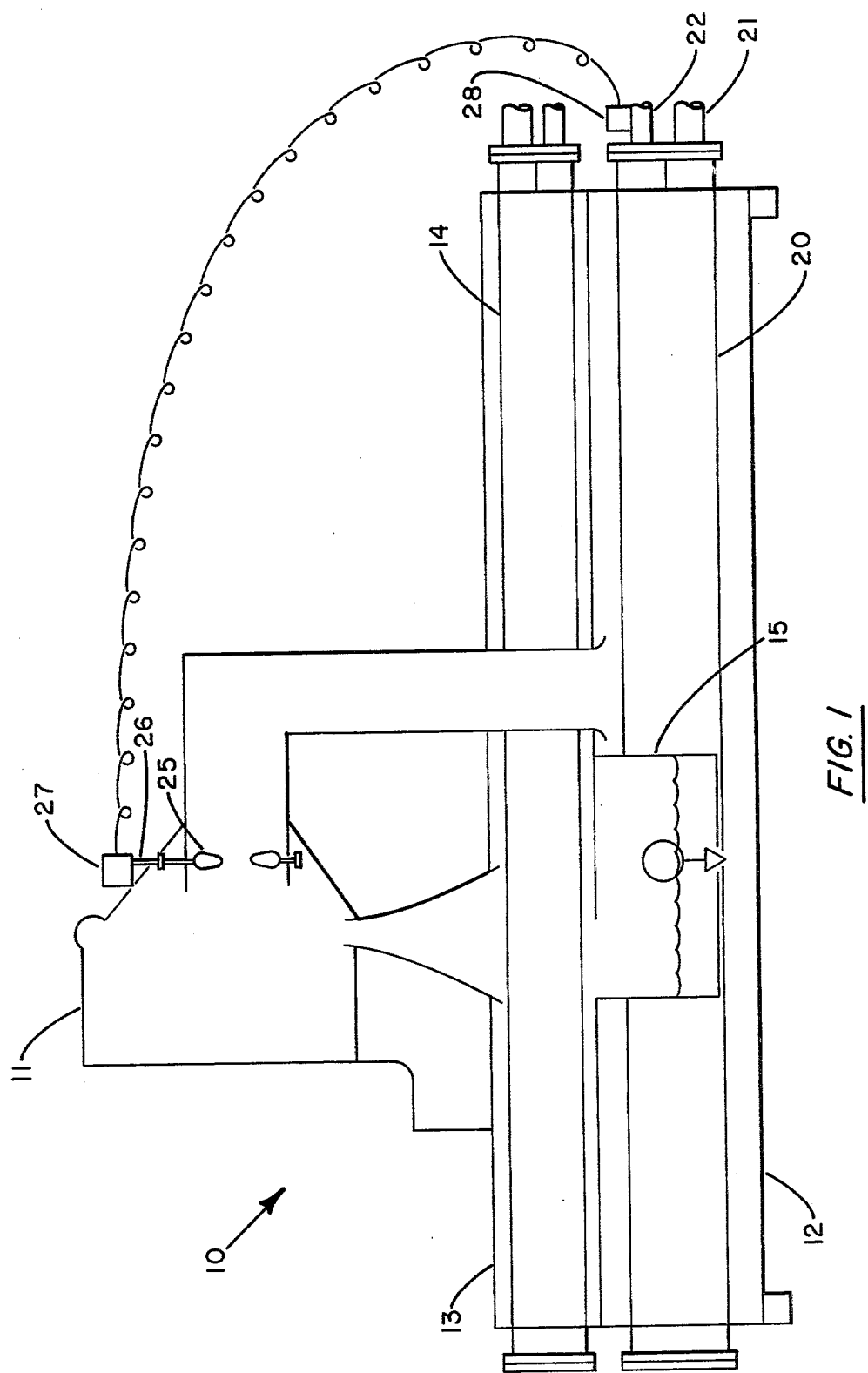
FIG. 1 is a simplified schematic representation of a centrifugal refrigeration machine.

Referring to the drawings, FIG. 1 is a schematic diagram of a centrifugal refrigeration machine 10. The machine 10 includes a compressor 11 arranged to extract refrigerant vapor from an evaporator 12 and compress the refrigerant, increasing the temperature and pressure of the refrigerant. The compressor then discharges the refrigerant into a condensor 13 wherein the refrigerant is cooled by means of a cooling liquid flowing through a heat exchanger 14 which is located in the condenser. From the condenser 13 the refrigerant passes through an expansion control device 15, decreasing in pressure and temperature, and into the evaporator 12. A heat exchange coil 20, commonly referred to as the chilled water coil, is located in the evaporator 12. Water, or some other heat transfer medium, enters the coil 20 through inlet line 21, flows through the coil and the evaporator 12, and exits the coil through outlet line 22. The water is cooled as it flows through the chilled water coil 20, transferring heat to the refrigerant in the evaporator 12. After leaving the evaporator 12, the chilled water can be delivered to a remote point to satisfy a refrigeration load.

A plurality of movable guide vanes 25, which are connected by a linkage 26 to power means 27 such as a reversible electric motor, are positioned between the compressor 11 and the evaporator 12 to regulate the quantity of refrigerant vapor flowing through the compressor. The guide vanes 25, thus, regulate the amount of of work done by, or, in other words, the load on, the compressor 11. The motor 27 is electrically connected to a sensor 28 which communicates with the outlet line 22 of the chilled water coil 20 and which produces an electric signal indicative of the temperature of the chilled water passing through the outlet line. Preferably sensor 28 is a NTC variable resistor whose resistance increases directly with the temperature of the chilled water passing through outlet line 22. It will be apparent to one skilled in the art, however, that, with appropriate changes, a PTC resistor, whose resistance increases inversely with the temperature of the chilled water, could also be used.

Figure 2:
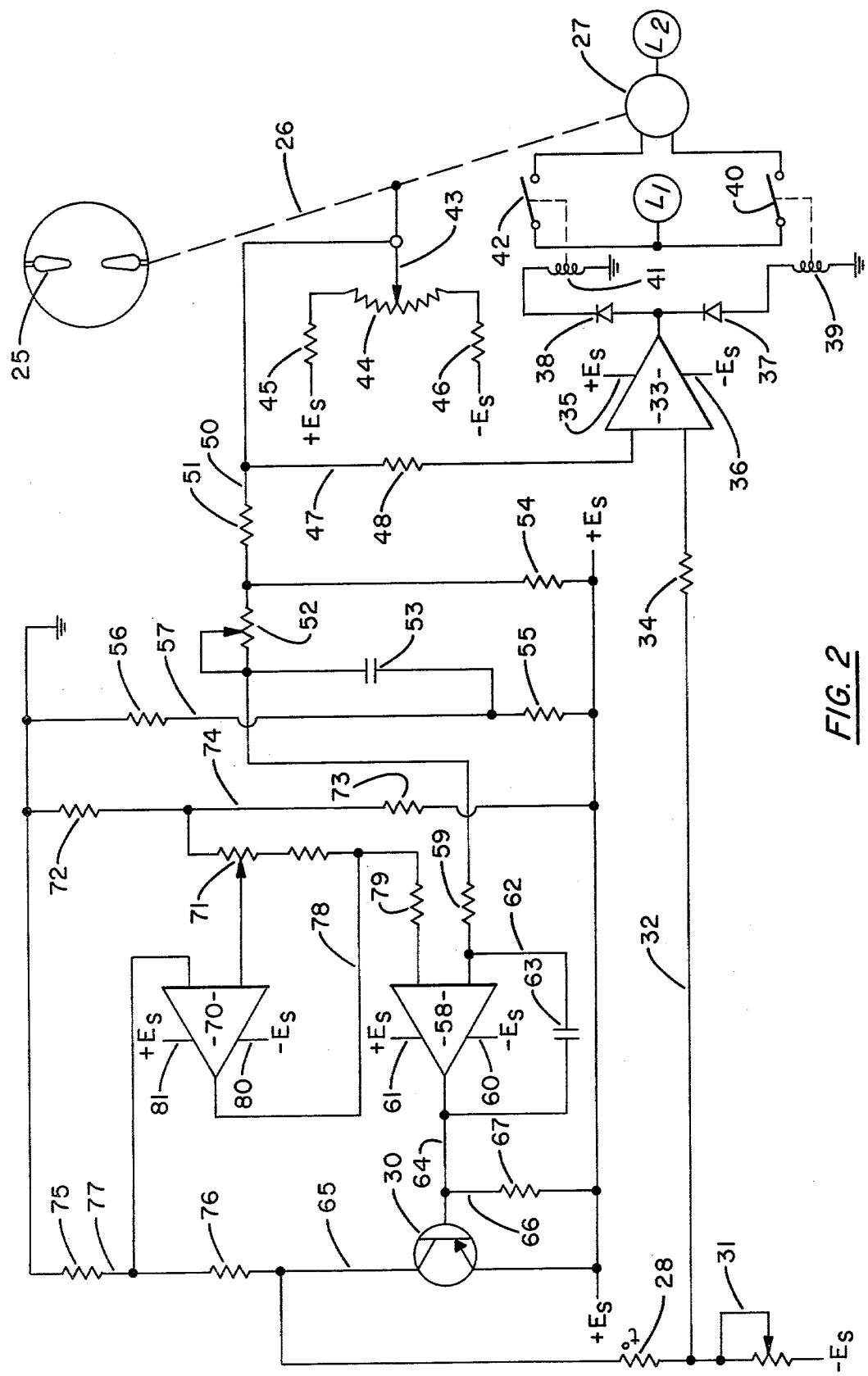
FIG. 2 is a schematic representation of an electric control circuit designed according to the present invention for use with the centrifugal refrigeration machine shown in FIG. 1.

The electric circuit connecting the resistor 28 with the motor 27 is shown schematically in FIG. 2. This circuit is designed for use with a DC voltage represented by $+E_s$ and $-E_s$. Generally, a DC voltage is not readily available, but an AC voltage is available. Accordingly, a full wave diode rectifier is usually provided for converting the AC voltage to the DC voltage. Such rectifiers are well known in the art, and it is unnecessary to describe them herein.

The electric circuit shown in FIG. 2 also includes a PNP transistor 30 and a resistor 31. The emitter and collector of transistor 30 and resistor 31 are connected in series with resistor 28 between the source of DC voltage. These elements operate in combination to produce a variable voltage signal in line 32. The voltage signal in line 32 is applied to a first input of operational amplifier 33, through resistor 34. The operational amplifier 33 is powered by the DC power source, which is connected to the amplifier through lines 35 and 36. Connected to the output of the operational amplifier 33 are a first diode 37 and a second diode 38. Diode 37 permits only passage of a negative voltage signal, and diode 38 permits only passage of a positive voltage signal. Connected in series with diode 37 is relay coil 39, the energization of which operates to close normally open switch 40. Connected in series with diode 38 is relay coil 41, the energization of which operates to close normally open switch 42.

The reversible electric motor 27 is connected to a source of alternating current, represented by $L_1$ and $L_2$, through each of the switches 40 and 42. The closing of switch 40 will actuate the motor 27 so that the guide vanes 25, which are connected to the motor through linkage 26, will move toward a fully closed position. Conversely, the closing of switch 42 will actuate motor 27 so that the guide vanes 25 will rotate toward a fully open position. Linkage 26 has movably connected thereto a wiper blade 43 of a variable potentiometer 44. The potentiometer 44 is connected in series with fixed resistors 45 and 46 to the source of DC voltage, represented by $+E_s$ and $-E_s$. As the linkage 26 moves the guide vanes 25, it also moves the wiper blade 43 to vary the output of the potentiometer 44. Thus, the output voltage of the potentiometer 44 is a function of the position of the guide vanes 25.

The output voltage from the potentiometer 44 is supplied via line 47 and resistor 48 to a second input of operational amplifier 33. The operational amplifier 33 compares the voltage signal from the potentiometer 44 and the voltage signal in line 32. If the former is greater than the latter, the output of amplifier 33 has a negative polarity. If the former is less than the latter, the output of amplifier 33 has a positive polarity. The output of the operational amplifier 33 passes, depending on which input signal is greater, through either diode 37 or diode 38 to close either switch 40 or 42, moving the guide vanes 25 and changing the voltage output of potentiometer 44. The position of the guide vanes 25 and, thus, the voltage output of the potentiometer 44 continue to change until the voltage output of the potentiometer equals the voltage signal in line 32. When this occurs, there is no output from the operational amplifier 33, the guide vanes 25 stop moving, and the refrigeration machine 10 reaches an equilibrium state.

The output voltage of the variable potentiometer 44 is also fed through line 50 and resistor 51 to the input side of an RC network comprised of resistor 52 and capacitor 53. The input side of the RC network is also connected to a source of DC voltage, represented as $+E_s$, through resistor 54. In this manner, the input voltage of the RC network is a linear function of the output voltage from the potentiometer 44. The output of the RC network rises exponentially until reaching a maximum value that is linearly proportional to the input. Thus, as is well known in the art, the RC network is effective to produce a time delay in the electric signal passing therethrough.

Preferably, resistor 52 is a variable resistor and can be adjusted by an operator to vary the time delay produced by the RC network so that the produced time delay is suitable considering the conditions under which the refrigeration machine 10 is operating. A variable delay of a few seconds to over 10 minutes can be built into the control. Further, in a preferred mode, in order to prevent the capacitor 53 from becoming overcharged, it is biased by a voltage which is developed by a voltage divider comprising resistors 55 and 56 positioned serially in line 57 connecting the DC voltage source $+E_s$ to ground.

The output from the RC network is applied to a first input of operational amplifier 58 through resistor 59. A reference signal, discussed in detail below, is applied to the second input of the operational amplifier 58. The reference signal is larger than the output of the RC network, and the amplifier 58 amplifies the difference between these two signals. The operational amplifier 58 is powered by the DC power source, which is connected to the amplifier through lines 60 and 61. A feedback loop 62 having capacitor 63 is provided for, as is well known by those skilled in the art, controlling the operation and the operational range of the amplifier 58. The output from the operational amplifier 58 is directed to the base of the transistor 30 through line 64. The emitter and the collector of the transistor 30 are connected to the DC power supply, represented by $+E_s$, through line 65. The base of the transistor 30 is also connected to the DC power source $+E_s$ through line 66 and resistor 67. Thus, the transistor 30 is biased such that, when there is a low voltage output from the operational amplifier 58, the transistor acts as a closed switch in line 65, and there is no voltage drop between the emitter and collector of the transistor. When there is an output from the operational amplifier 58, its effect on the transistor 30 is to produce a voltage drop between the collector and emitter of the transistor 30; and, as the output from the operational amplifier increases, this voltage drop increases proportionally.

This control signal is used, in accordance with the present invention, as explained in greater detail below, to raise the chilled water setpoint temperature as the load on the machine 10 decreases. As pointed out above, this can result in substantial operational and energy savings by decreasing the amount of work done by the compressor 11.

As discussed above, the emitter and collector of transistor 30 and resistor 31 are connected in series with resistor 28 between the source of DC voltage, and these elements cooperate to produce a variable voltage signal in line 32. The voltage drop across resistor 28 is a function of the temperature of the chilled water leaving the evaporator 12, and the setpoint temperature is defined as that temperature of the chilled water which produces a voltage drop across resistor 28 such that the voltage signal in line 32 has zero magnitude. That is, referring to FIG. 2, when the chilled water leaving the evaporator 12 is at the setpoint temperature, the voltage drop from the emitter to the collector of transistor 30 plus the voltage drop across resistor 28 eauals the voltage drop across resistor 31. When the temperature of the chilled water leaving the evaporator 12 is above the setpoint temperature, the voltage drop from the emitter to the collector of transistor 30 plus the voltage drop across resistor 28 is less than the voltage drop across resistor 31, and a voltage signal of positive polarity is produced in line 32. When the temperature of the chilled water leaving the evaporator 12 is below the setpoint temperature, the voltage drop from the emitter to the collector of transistor 30 plus the voltage drop across resistor 28 is greater than the voltage drop across resistor 31, and a voltage signal of negative polarity is produced in line 32.

Thus, the setpoint temperature can be considered as being established by the voltage drop across resistor 31 less the emitter-collector voltage drop of transistor 30. The former voltage drop is referred to herein as representing a fixed component of the setpoint temperature, and the latter voltage drop is referred to herein as representing a variable component of the setpoint temperature. Resistor 31 is preferably a variable resistance element such as a potentiometer that may be selectively regulated by an operator so that the fixed component of the chilled water setpoint temperature can be changed by the operator. Although the fixed component of the chilled water setpoint temperature can be changed, it is referred to herein as "fixed" to distinguish it from the component of the setpoint temperature represented by the emitter-collector voltage of the transistor 30.

To better understand the manner in which the control circuit shown in FIG. 2 operates a vary the chilled water setpoint temperature, assume that the machine 10 is operating at a stable condition and the refrigeration load on the machine decreases. At a stable condition, the voltage signal in line 32 has the same magnitude as the voltage output of potentiometer 44. In this case, there is no output from operational amplifier 33, motor 27 is inactive, and guide vanes 25 are stationary, which is the definition of stable operating conditions. It may be helpful to note at this point that it is not necessary, in order that the machine 10 operate at a stable condition, that the temperature of the chilled water leaving the evaporator 12 be at the setpoint temperature. Stable conditions will result as long as the voltage signal in line 32, which represents the difference between the leaving chilled water temperature and the setpoint temperature, has the same magnitude as the voltage output of potentiometer 44.

As the refrigeration load decreases, the temperature of the chilled water leaving the evaporator 12 decreases, reflecting the decreased load. The lower chilled water temperature increases the resistance of resistor 28, increasing the voltage drop across the resistor. This decreases the voltage signal in line 32 and causes the voltage signal in this line to become less than the voltage output from the potentiometer 44.

The operational amplifier 33 compares the voltage signal from the potentiometer 44 with the voltage signal in line 32. Since the former is now greater than the latter, the output of amplifier 33 has a negative voltage polarity. This output passes through diode 37 and switch 40 is closed. This activates the motor 27 so as to move linkage 26 to move the guide vanes 25 toward the closed position. This movement of the guide vanes 25 decreases the load on the compressor 11 and tends to increase the temperature of the chilled water leaving the evaporator 12. Movement of linkage 26 that moves the guide vanes 25 toward the closed position will move the wiper blade 43, as viewed in FIG. 2, in a clockwise direction, decreasing the voltage output of the potentiometer 44. Thus, as the load on the compressor 11 decreases, the leaving chilled water temperature increases and the voltage output of the potentiometer 44 decreases. This movement of linkage 26, guide vanes 25, and wiper blade 43 continues until the voltage output of potentiometer 44 equals the voltage signal in line 32. When this occurs, an equilibrium point is reached, and the guide vanes 25 become stable.

As the voltage output of the potentiometer 44 decreases, the voltage input to the RC network comprised of resistor 52 and capacitor 53 also decreases. When this occurs the voltage output of the RC network begins to decrease; but this decrease is delayed, as is well known in the art, by the RC network. This time delay is useful in that it promotes stability of the control system by allowing the guide vanes 25 to reach a stable position after moving in response to a change in temperature of the chilled water leaving the evaporator 12, before the setpoint temperature is changed.

The operational amplifier 58 amplifies the difference between the voltage output of the RC network and the reference signal, discussed in greater detail below. Once the voltage output from the RC network begins to decrease, the difference between that voltage signal and the reference signal begins to increase, and the voltage output of amplifier 58 begin to increase. The output of amplifier 58 is directed to the base of transistor 30; and, as referred to above, as the output of the amplifier increases, the emitter-collector voltage of the transistor increases, increasing the variable component of the chilled water setpoint temperature. Thus, it is seen that the chilled water setpoint temperature increases in response to the decrease in the refrigeration load on the machine 10.

Increasing the chilled water setpoint temperature in this manner acts to maintain the guide vanes 25 in the position they reached after moving toward the fully closed position as an initial response to the decreased refrigeration load placed on the machine 10. Moving the guide vanes 25 toward the fully closed position has the effect of increasing the temperature of the chilled water leaving the evaporator 12, which decreases the voltage drop across resistor 28. This has the effect of increasing the voltage signal in line 32 and moving the guide vanes 25 back toward the fully open position, which would increase the amount of work done by the compressor 11. Introducing the increasing emitter-collector voltage of transistor 30 in series with the decreasing voltage across resistor 28 counteracts the effect the decreasing voltage drop across resistor 28 has on the signal in line 32, preventing the guide vanes 25 from moving back toward the fully open position. The guide vanes 25 remain in a more closed position, resulting in a substantial savings in the amount of energy required to operate the compressor 11.

Now, for purposes of discussion, assume the refrigeration machine 10 is operating at a stable condition and the refrigeration load increases. This causes the temperature of the chilled water leaving the evaporator 12 to increase, causing an increase in the voltage signal in line 32. The output of operational amplifier 33 has a positive polarity, causing switch 42 to close, and causing linkage 26 to move the guide vanes 25 toward the fully open position. This movement of the guide vanes 25 increases the load on the compressor 11, allowing the compressor to respond to the increased refrigeration load and tending to decrease the temperature of the chilled water leaving the evaporator 12. At the same time, linkage 26 moves wiper blade 43, as viewed in FIG. 2, in a counterclockwise direction, increasing the voltage output of potentiometer 44. In this manner, as the load on the compressor 11 increases, the leaving chilled water temperature decreases and the voltage output of the potentiometer 44 increases. This movement of linkage 26, guide vanes 25, and wiper blade 43 continues until the voltage output of potentiometer 44 equals the voltage signal in line 32; and, when this occurs, an equilibrium point is reached, and the guide vanes 25 become stable.

The increasing voltage output of the potentiometer 44 is also fed through the RC network and through the operational amplifier 58. The RC network is effective to delay the increasing voltage signal passing therethrough. As the output voltage of the RC network increases, the difference between that voltage and the reference voltage decreases, and operational amplifier 58 amplifies this decreasing voltage difference. This time delayed and amplified decreasing voltage signal is then directed to the base of transistor 30; and its effect on the transistor 30 is to decrease the emitter-collector voltage of the transistor, decreasing the variable component of the chilled water setpoint temperature.

Decreasing the chilled water setpoint temperature as the load on the refrigeration machine 10 increases, effectively counterbalances any increase in the setpoint temperature that occurred in response to a decrease in the load on the refrigeration machine. This allows the refrigeration machine 10 and the compressor 11 to fully respond to the increased load.

The above-described electric control is a very simple and inexpensive yet reliable apparatus for automatically varying the chilled water setpoint temperature of a mechanical refrigeration machine. However, it should be understood that the specific control circuit shown for obtaining the desired features described hereinabove is merely illustrative, and other schemes that might perform a similar function may be employed in lieu thereof. Further, in the embodiment described herein, the electric control signal representing the variable component of the chilled water setpoint temperature, the emitter-collector voltage of transistor 30, is inversely proportional to the load on the machine 10. That is, as discussed at length above, as the load on the machine 10 and compressor 11 increases, the emitter-collector voltage of transistor 30 decreases; whereas, when the load on the machine and compressor decreases, the emitter-collector voltage of transistor 30 increases. It should be understood, though, that it is not necessary to the present invention that this electric control signal be inversely proportional to the load on the machine 10. A signal which is directly proportional to the load could also be used. Such a signal would be fed into the first input of operational amplifier 33 in series with the signal produced by resistor 31.

A further advantage of the present invention is that, since many existing machines have a resistor 31 and a sensor 28, or equivalents thereof, and means such as a variable potentiometer 44 for producing an electric control signal in response to the load on the machine, the above-described chilled water setpoint temperature control can easily and quickly be installed on many existing machines. The control can be installed quite simply by securing a first wire to a ground, a second wire to the DC power source represented by $+E_s$, a third wire to sense the output voltage of the potentiometer 44, and a fourth wire to introduce the emitter-collector voltage of transistor 30 in series with the voltage drop across resistor 28.

The circuit shown in FIG. 2 also includes an operational amplifier 70 powered by the DC power source, represented by $+E_s$ and $-E_s$, which is connected to the amplifier through lines 80 and 81. A first voltage is introduced into a first input of the operational amplifier 70 through a voltage divider and a resistor 71. The voltage divider comprises resistors 72 and 73 arranged serially in line 74 which connects the DC voltage source $+E_s$ to ground. A second voltage, which is smaller than the first voltage, is introduced into a second input of the operational amplifier 70 through a voltage divider comprising resistors 75 and 76 arranged serially in line 77 which connects the collector of transistor 30 to ground. The operational amplifier 70 amplifies the difference between these two voltages and this amplified voltage difference is then sent as the reference signal to the second input of operational amplifier 58, through line 78 and resistor 79.

The second input voltage of the amplifier 70 and, hence, the reference signal change, of course, as the voltage between the collector of the transistor 30 and ground changes. This latter voltage changes, as discussed above, as the output of the operational amplifier 58 changes. Thus, the amplifier 58 involves a feedback loop.

Specifically, as the output of the RC network increases in response, as discussed in detail above, to an increase in the load on the machine 10, the first input of operational amplifier 58 increases and this has the effect of decreasing the output of the amplifier. This decrease the emitter-collector voltage of transistor 30, increasing the voltage drop between the collector of transistor 30 and ground. This latter increasing voltage has the effect of increasing the second input of operational amplifier 70, decreasing the output of the amplifier, which is the reference signal. The decreasing reference signal, fed into the second input of operational amplifier 58, decreases the difference between the first and second inputs of that amplifier, further decreasing the output of amplifier 58. When the output of the RC network reaches a stable value, the output of the operational amplifier 58 also reaches a stable value. This causes the voltage difference between the collector of transistor 30 and ground to become stable, causing the second input and the output of amplifier 70 to become stable.

On the other hand, if the output of the RC network decreases in response to a decrease in the load on the machine 10, the first input of operational amplifier 58 decreases, which increases the output of the amplifier. This increases the emitter-collector voltage of transistor 30, decreasing the voltage difference between the collector of the transistor and ground. This decreases the second input of the amplifier 70 and increases the output of that amplifier. This output is fed into the second input of operational amplifier 58, further tending to increase the output of the amplifier. This course of events continues until the output of the RC network becomes stable. This causes the first input and the output of amplifier 58, the collector-ground voltage of transistor 30, and the output of amplifier 70 all to become stable.

Resistor 71 controls the value of the first input of amplifier 70 and the maximum value of the difference between the first input and the second input of the amplifier. In this way, resistor 71 controls the maximum value of the reference signal, which controls the maximum value of the variable component of the setpoint temperature. Preferably this resistor 71 is a variable resistance element that may be selectively regulated by an operator so that the maximum value of the variable component of the setpoint temperature can be adjusted depending upon particular operating conditions.

While it is apparent that the invention herein disclosed is well calculated to fulfill the objects above stated, it will be appreciated that numerous modifications and embodiments may be devised by those skilled in the art and it is intended that the appended claims cover all such modifications and embodiments as fall within the true spirit and scope of the present invention.

What is claimed is:

1. In a control for a mechanical refrigeration machine having means to produce a first electric control signal having a magnitude that is a function of the amount of work done by a compressor of the machine, and means to produce a second electric control signal having a magnitude which represents a variable component of a setpoint temperature, the improvement comprising:
    means to sense the magnitude of the first electric control signal;
    means to change the magnitude of the second electric control signal in response to a change in the magnitude of the first electric control signal so that the variable component of the setpoint temperature changes in response to a change in the amount of work done by the compressor; and
    means to delay changing the magnitude of the second electric control signal so that the amount of work done by the compressor becomes stable before the variable component of the setpoint temperature changes.

2. The improvement of claim 1 wherein the delaying means includes an RC network.

3. The improvement of claim 2 wherein the RC network includes a variable resistor.

4. The improvement of claim 1 wherein the changing means includes:
    an amplifier; and
    means to produce a reference electric control signal.

5. The improvement of claim 4 wherein the means to produce the reference electric signal includes a variable resistor.

6. An automatic chilled water setpoint temperature control for use with a mechanical refrigeration machine having an evaporator wherein a refrigerant absorbs heat from a heat transfer medium passing therethrough, a compressor to extract refrigerant vapor from the evaporator and compress the refrigerant, and a compressor control including first means to produce a first electric control signal representing the difference between the temperature of heat transfer medium leaving the evaporator and a setpoint temperature, the first means including means to produce a second electric control signal representing a variable component of the setpoint temperature; means to vary the amount of work done by the compressor in response to a change in the magnitude of the first electric control signal; and third means to produce a third electric control signal that is a function of the amount of work done by the compressor, comprising:
    means to sense the magnitude of the third electric control signal;
    means to change the magnitude of the second electric control signal in response to a change in the magnitude of the third electric control signal so that the variable component of the setpoint temperature changes in response to a change in the amount of work done by the compressor; and
    means to delay changing the magnitude of the second electric control signal so that the amount of work done by the compressor becomes stable before the variable component of the setpoint temperature changes.

7. A method of operating a refrigeration system having a cooler for chilling a heat transfer medium passing therethrough, comprising the steps of:
    sensing the temperature of the heat transfer medium leaving the cooler;
    producing a first electric control signal having a magnitude that is a function of the difference between the temperature of the heat transfer medium leaving the cooler and a setpoint temperature;

changing the amount of work done by the refrigeration machine in response to a change in the magnitude of the first electric control signal;

producing a second electric control signal that is a function of the amount of work done by the refrigeration machine; and varying the setpoint temperature in response to the magnitude of the second electric control signal.

8. The method of claim 7 wherein:

the step of producing the first electric control signal includes the step of producing a third electric control signal having a magnitude representing a variable component of the setpoint temperature; and the step of varying the setpoint temperature includes the steps of:

sensing the magnitude of the second electric control signal;

changing the magnitude of the third electric control signal in response to a change in the magnitude of the second electric control signal; and delaying the changing step so that the variable component of the setpoint temperature does not change until the capacity of the refrigeration machine becomes stable.

9. A control for use with a centrifugal refrigeration machine having an evaporator wherein a refrigerant absorbs heat from a heat transfer medium passing therethrough, and a compressor to extract refrigerant vapor from the evaporator and compress the refrigerant, including:

first means to produce a first electric control signal representing the difference between the temperature of the heat transfer medium leaving the evaporator and a setpoint temperature, the first means including second means to produce a second electric control signal representing a variable component of the setpoint temperature;

vapor flow control means responsive to a change in the magnitude of the first electrical control signal for regulating the amount of refrigerant vapor flowing through the compressor;

third means to produce a third electric control signal that is a function of the amount of work done by the compressor;

means to sense the magnitude of the third electric control signal;

means to change the magnitude of the second electric control signal in response to a change in the magnitude of the third electric control signal so that the variable component of the setpoint temperature changes in response to a change in the amount of work done by the compressor; and means to delay changing the magnitude of the second electric control signal so that the magnitude of the second electric control signal does not change substantially until the change in the amount of work done by the compressor has an effect on the temperature of the heat transfer medium passing through the evaporator.

10. A control as defined in claim 9 wherein:

the vapor flow control means includes, a plurality of movable guide vanes positioned between the compressor and the evaporator, a linkage for moving the guide vanes, and power means for moving the linkage;

the first means further includes, fourth means to produce a fourth electric control signal representing a fixed component of the setpoint temperature, and fifth means to produce a fifth electric control signal responsive to the temperature of the heat transfer medium leaving the evaporator;

the changing means includes an amplifier; and the delaying means includes an RC network.

11. A control as defined in claim 10 wherein:

the power means includes a reversible electric motor;

the third means includes a variable potentiometer having wiper blade means connected to the linkage so that the output voltage of the variable potentiometer is a function of the position of the guide vanes and a function of the load on the centrifugal refrigeration machine;

the fourth means incluces a variable resistor so that the fixed component of the setpoint temperature can be varied by an operator;

the fifth means includes an NTC or a PTC variable resistor;

the changing means and the second means include a transistor having an emitter, a collector, and a base, and biased so that the voltage drop between the emitter and the collector is proportional to the voltage input to the base;

the changing means further includes a variable resistor for regulating the maximum value of the magnitude of the second electric control signal and the maximum value of the variable component of the setpoint temperature; and the RC network includes a variable resistor.

* * * * *